June 25, 1968 L. H. TURNER 3,389,907
DOCUMENT-HANDLING APPARATUS
Filed Oct. 17, 1966 6 Sheets-Sheet 1

INVENTOR.
LYMAN H. TURNER
BY
ATTORNEYS

June 25, 1968 L. H. TURNER 3,389,907
DOCUMENT-HANDLING APPARATUS
Filed Oct. 17, 1966 6 Sheets-Sheet 2
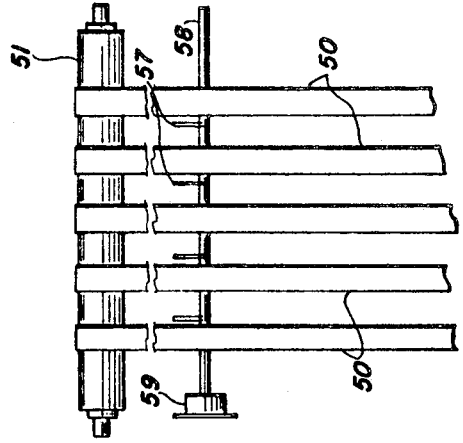
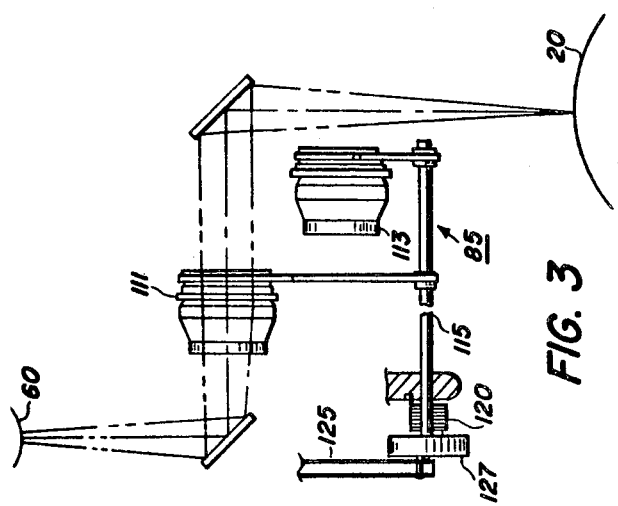
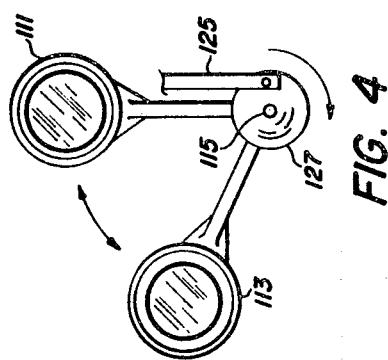
INVENTOR.
LYMAN H. TURNER
BY
ATTORNEYS June 25, 1968     L. H. TURNER     3,389,907
DOCUMENT-HANDLING APPARATUS
Filed Oct. 17, 1966     6 Sheets-Sheet 3
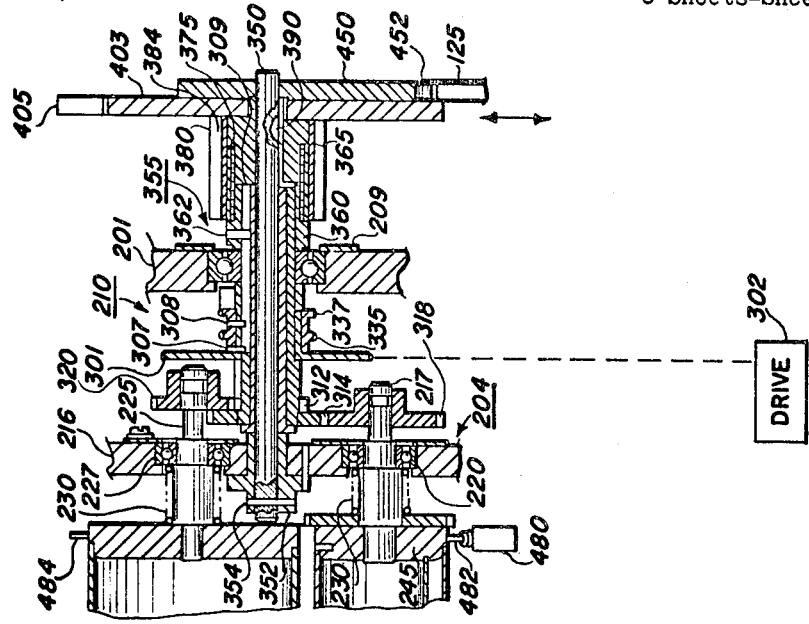
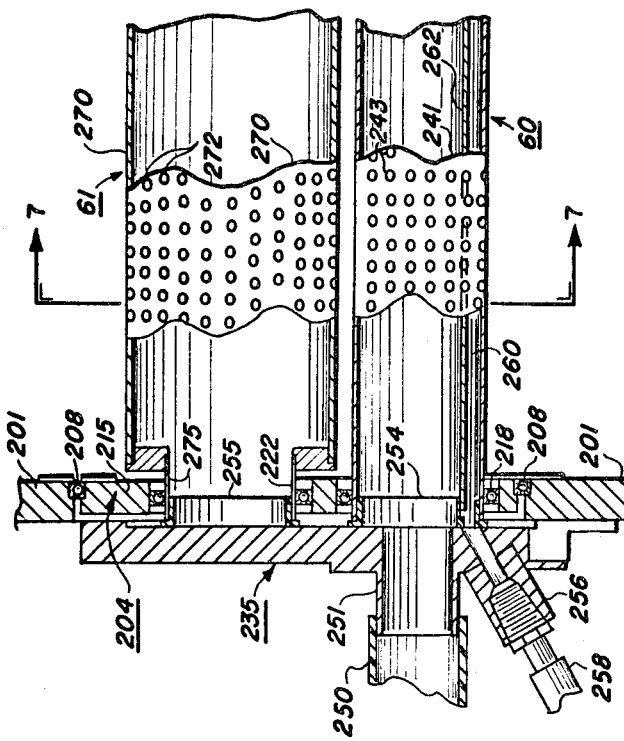
FIG. 5
INVENTOR.
LYMAN H. TURNER
BY
ATTORNEYS June 25, 1968   L. H. TURNER   3,389,907
DOCUMENT-HANDLING APPARATUS Filed Oct. 17, 1966   6 Sheets-Sheet 4

INVENTOR.
LYMAN H. TURNER
BY
ATTORNEYS

June 25, 1968  L. H. TURNER  3,389,907
DOCUMENT-HANDLING APPARATUS
Filed Oct. 17, 1966  6 Sheets-Sheet 5

INVENTOR.
LYMAN H. TURNER
BY Stanley Z. Cole
B.A. Chiama
ATTORNEYS

June 25, 1968 L. H. TURNER 3,389,907
DOCUMENT-HANDLING APPARATUS
Filed Oct. 17, 1966 6 Sheets-Sheet 6

INVENTOR.
LYMAN H. TURNER
BY Stanley Cole
B.A. Chiana
ATTORNEYS

United States Patent Office 3,389,907
Patented June 25, 1968

3,389,907
DOCUMENT-HANDLING APPARATUS
Lyman H. Turner, Pittsford, N.Y., assignor to Xerox Corporation, Rochester, N.Y., a corporation of New York
Filed Oct. 17, 1966, Ser. No. 587,109
5 Claims. (Cl. 271—74)

This invention relates to document feed apparatus and, in particular, to an improved sheet handling conveyor for transporting documents in seriatim in a circular path past an exposure station or the like.

Both in the printing art and in the document reproducing art, various devices have been designed and constructed by which thin flexible sheets, such as documents or sheets of paper are carried in a circular path on a cylindrical drum. Normally, these devices employ gripper fingers arranged to permit releasable retention of a flexible sheet onto the drum and operative to release these sheets from the drum when desired.

It has been found that sheets will sometimes continue to adhere to the drum even after release by the gripper fingers because of static electricity or other causes. Moreover, the gripper fingers leave undesirable imprints on copies reproduced detracting from the overall quality of reproduction.

Now in accordance with the present invention it is possible to feed documents in seriatim past a reproducing station without any complex mechanisms, such as, gripper fingers. Generally speaking this is accomplished by wrapping the document one at a time about a drum conveyor which holds the document by a vacuum pull exerted through apertures formed in the drum periphery. After a predetermined interval the document is released from the drum by momentarily breaking the vacuum selectively at the leading edge to separate the document from the drum.

It is, therefore, an object of this invention to improve document feed mechanisms for transporting documents in seriatim in a circular path past a copying station or the like.

It is another object of the invention to ensure separation of a document from a conveyor drum without the necessity of complex mechanisms or stopping the drum.

It is a further object of this invention to produce multiple copies of varied length documents more simple and rapid than heretofore.

It is still a further object of this invention to enable feeding documents into a reproduction machine or the like in seriatim simply and automatically.

These and other objects will become more apparent in connection with the subsequent description and the drawings in which:

FIG. 2 illustrates document feed belts shown by FIGURE 1 in greater detail;

FIGURES 3 and 4 illustrate side and end views of the optical turret assembly respectively;

FIGURE 5 is a side view of the document turret assembly with parts in section to show detail;

Figure 1:
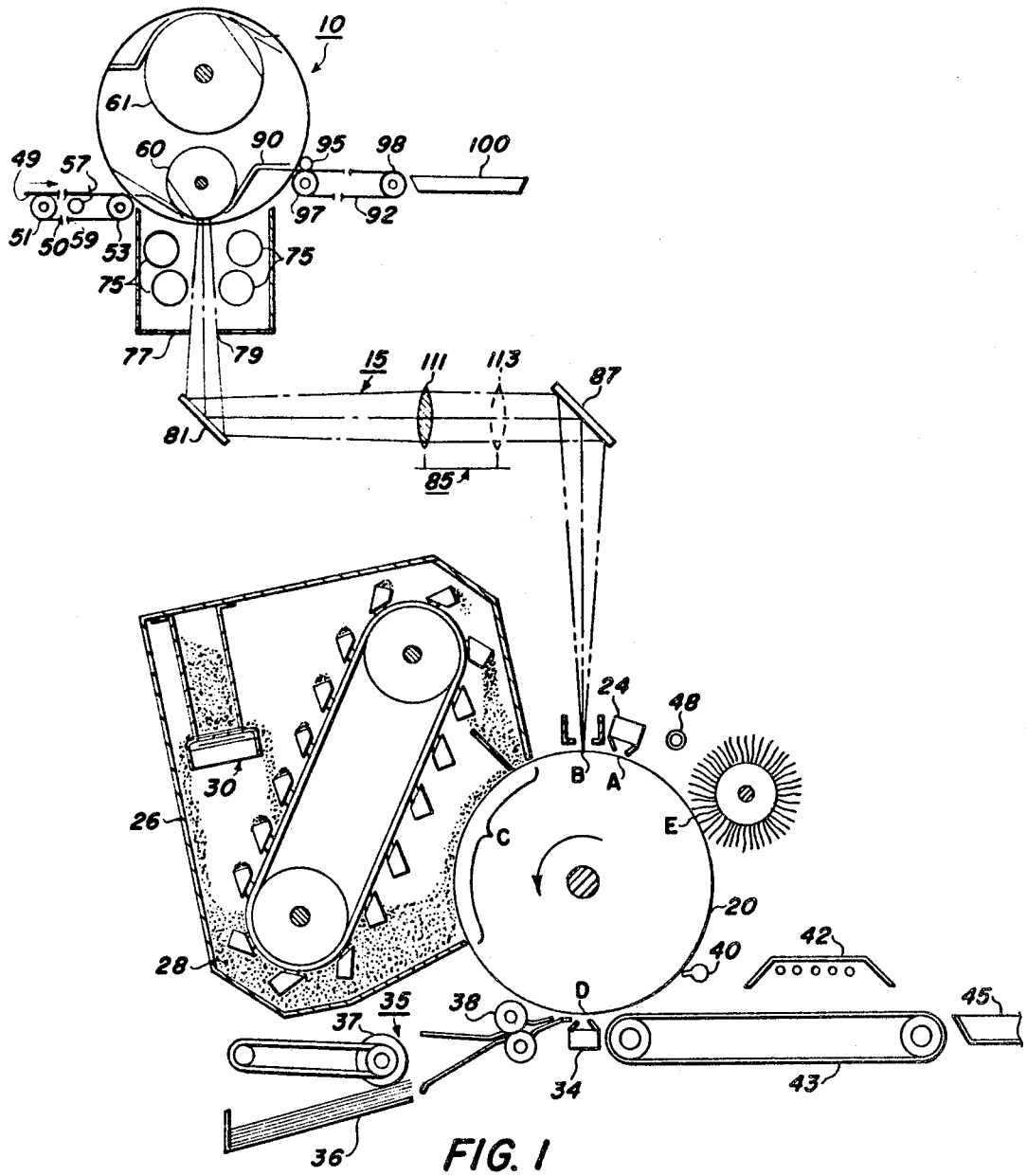
FIG. 1 is a schematic sectional view of a drum-type xerographic apparatus incorporating the present invention.
Figure 6:
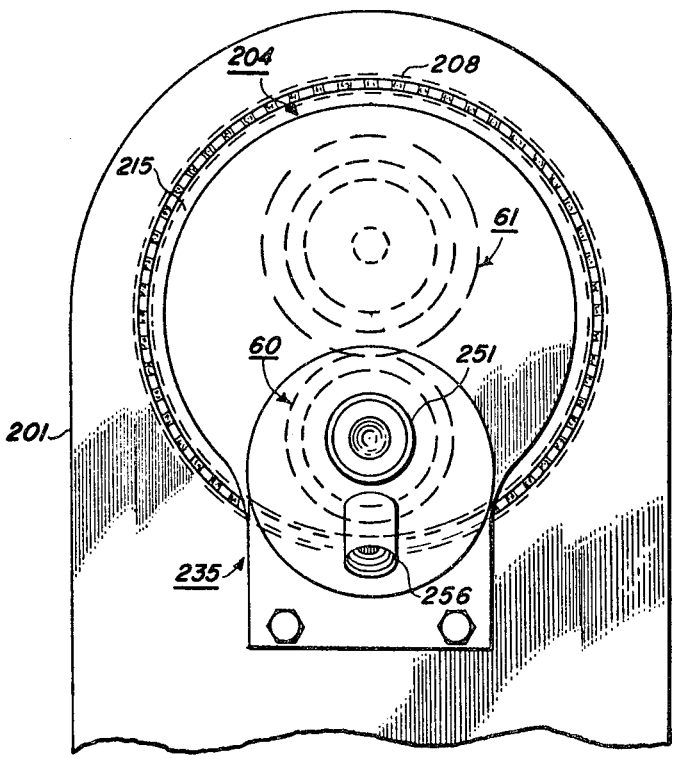
FIGURE 6 is a left hand end view of the turret assembly shown in FIGURE 5.

Referring now to the drawings wherein like numerals designate like parts, there is shown schematically in FIG. 1 and automatic xerographic recording machine incorporating a document turret feed and scanning mechanism according to the present invention. The document to be reproduced is scanned while being rotated in a turret assembly generally designated 10 and the light pattern produced by the scanning operation is projected by an optical assembly generally designated 15. The light pattern is projected onto a photoconductive layer on a conductive backing formed in the shape of a drum generally designated 20. The drum is mounted on a shaft journaled in a frame to rotate in the direction indicated by the arrow to cause the drum surface sequentially to pass a plurality of xerographic processing stations as described more fully in U.S. Patent 3,062,109 to Mayo et al.

For the purpose of the present disclosure, the several xerographic processing stations in the path of movement of the drum surface may be described functionally, as follows:

A charging station, preferably located as indicated by reference character A, at which a uniform electrostatic charge is deposited on the photoconductive layer of the xerographic drum. This is generally accomplished by a corona charging device 24.

Next subsequent thereto in the path of motion of the xerographic drum is exposure station B at which a light pattern of the document is projected onto the drum surface to dissipate the drum charge in the exposed areas thereof. Thus a latent electrostatic image of the document to be reproduced is formed.

Adjacent to the exposure station is a developing station C in which there is positioned a developer apparatus including a container 26 having a lower sump portion for accumulating developing material 28. As toner powder images are formed, additional toner particles must be supplied to the developing material in proportion to the amount of toner deposited on the drum. For this purpose, a toner dispenser generally designated 30 is used to replenish toner to the developing material.

Positioned next and adjacent to the developing station is the image transfer station D at which the xerographic powder image is electrostatically transferred from the drum surface to cut-sheet transfer material. This is accomplished by a corona transfer device 34 similar to corona charging device 24.

A sheet feeding mechanism generally designated 35 serially feeds cut-sheet transfer material into contact with the xerographic drum so that the developed powder images on the surface of said drum may be transferred. The mechanism comprises a tray 36 for holding a supply of cut-sheet transfer material, separator rollers 37 for separating a single sheet of transfer material from said supply, feed rollers 38 for feeding a single sheet into impression contact with the drum and means for coordinating the operation of the separator rollers and feed rollers to thereby feed a single sheet of transfer material into contact with the drum for proper registration of the powder image on the drum onto the transfer material.

Immediately subsequent to transfer is a stripping device, generally designated 40, for removing the copy sheet from the drum surface. After stripping, the powder image is fused to the copy sheet by the fuser 42 and then transported by conveyor 43 to a copy tray 45.

The final station E is a drum cleaning and discharge station at which the drum surface is brushed to remove residual toner particles remaining after image transfer, and at which the drum surface is exposed to a relatively bright light source 48 to effect substantially complete discharge of any residual electrostatic charge remaining thereon.

Xerographic recording drum 20 moves at a fixed rate to transfer developed images onto standard size copy sheets which are also advanced at a fixed rate. Therefore, varied length documents reproduced must be scanned and the images optically corrected to produce the same length image on the drum surface.

In accordance with the invention, a document 49 to be reproduced is placed onto a plurality of continuously moving, endless belts 50 (see FIGURE 2) mounted on a pair of spaced apart parallel rollers 51 and 53 to advance the document toward a gate 55. Roller 53 is driven at a constant speed by a suitable drive motor not shown. Gate 55 arrests the document until such time as the machine is ready to print and comprises a plurality of spaced pins 57 mounted on a shaft 58 journaled for rotation beneath the belts. Shaft 58 is biased with pins 57 extending vertically between the belts 50 when in the rest or normal position by a spring (not shown). A rotary solenoid 59 rotates the shaft against the spring bias releasing the document upon receiving a signal from machine control (not shown). After being released by gate 55 the document is advanced onto one of the rotary platens of the document turret assembly 10 as will become more apparent.

Document turret assembly 10 contains a pair of rotary platens 60 and 61 having circumferences corresponding to a standard document size and a larger document size, respectively. It should be understood that more than two platens may be installed on the turret assembly but that only two have been shown for purposes of illustration. Platens 60 and 61 rotate on their own axis and also revolve about the axis of the turret assembly for positioning to receive the appropriate length document from belts 50. It should be noted that the lowermost or six o'clock position of both platens lies in the same plane. For a given document length there is a platen of corresponding circumference and angular velocity to effect the desired scanning rate as will be understood.

Figure 7:
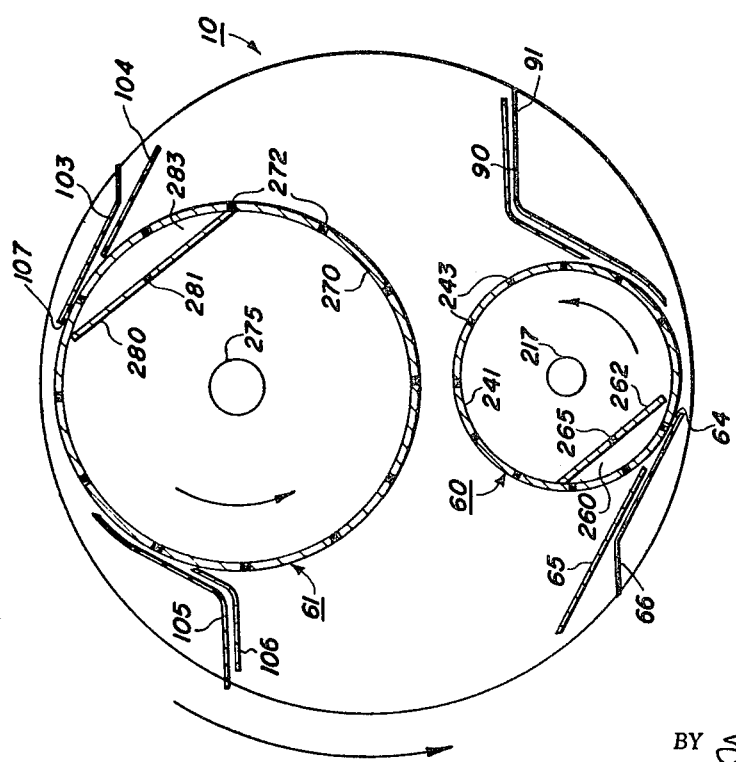
FIGURE 7 is a sectional view of the turret assembly taken along line 7—7 of FIGURE 5.

For the two turret arrangement illustrated the document is transferred to the smaller or standard size platen 60. A stop stud 64 on the periphery of platen 60 receives the leading edge of the document as it passes through spaced guides 65 on the turret frame as best shown in FIGURE 7. The document is pulled onto rotating platen 60 by a vacuum to be described more full hereinafter and is carried in the direction of rotation until completely wrapped around the platen. The document is now in scanning position which is in the six o'clock position on turret assembly 10.

Mounted directly below the turret assembly is a plurality of lamps 75 encased in a housing 77. In the bottom of the housing is a light tunnel 79 through which a light pattern can be reflected from the document toward optical assembly 15 which projects the light pattern onto the surface of drum 20.

Optical assembly 15 comprises an object mirror 81 positioned to receive a light image reflected from the document and to direct the image toward an adjustable lens turret 85 (FIGS. 3 and 4) for the requisite focusing. An image mirror 87 receives the image from the lens turret 85 and transmits the image onto the surface of the moving xerographic drum 20.

After the document has been scanned the desired number of times it is released from platen 60 by breaking the vacuum at the leading edge as it passes adjacent output guides 90 in a manner which will become more apparent. The vacuum release is only momentary to permit the leading edge of the document to flex away from the platen by its own stiffness and to be positioned within guides 90. Thereafter, the document is advanced through guides 90 due to movement imparted by continued rotation of the platen. This movement carries the document up through guides 90 to endless belt member 92 and pinch roller 95 which engage the document as it comes through the guides. Endless belt 92 is supported on a pair of spaced apart parallel rollers 97 and 98, the latter being continuously driven by a driver motor (not shown) to advance the document toward output tray 100.

Document recording on platen 61 is the same as that already described in the case of platen 60. With the latter, however, there is an optical reduction of the image as will become more apparent. Upon rotation of turret assembly 10 to revert the positions of the platens 60 and 61, the input guides 103 and output guides 105 are positioned adjacent belts 50 and belt 92, respectively, in the same manner as are guides 65 and 90 when the platen 60 is utilized. Stop stud 107 on the periphery of platen 61 receives the leading edge of the document. As can readily be appreciated platens 60 and 61 rotate at different angular velocities to obtain desired linear scanning rates for producing the same length image on drum 20.

To effect optical reduction of a large document wrapped around platen 61 while permitting one-to-one ratio of documents on platen 60, lens turret 85 comprises a pair of projection lenses 111 and 113 each having the requisite focal length for imaging onto drum 20 from its corresponding platen. The magnification of the lenses 111, 113 is chosen such that the same length image is produced on the drum surface with either of the platens. As shown in FIGURES 3 and 4, the lenses 111 and 113 are mounted on a shaft 115 so as to be radially displaced relative to the shaft axis and longitudinally spaced along the shaft. A torsion spring 120 is wrapped around shaft 115 to normally urge lens 111 for the platen 60 in the optical path. To displace the lens turret moving lens 113 into the optical path and lens 111 out of the optical path, a lever 125 pinned to a collar member 127 mounted on shaft 115 is utilized to rotate the collar member in the direction indicated by the arrow to compress spring 120. Actuation of the lever 125 may be coordinated with rotation of the turrent 10 thereby imparting simultaneous rotation of the document turret assembly to provide a matching lens as will be understood.

*Document turrent assembly*

Referring now to FIGURES 5 through 8, inclusive, there is shown in greater detail the structure of turret assembly 10. Machine frame 201 supports one end of turret frame 204 in ball bearings 208 while ball bearings 209 support a drive assembly 210 for the turret frame on the opposite end. Turret frame 204 comprises a pair of spaced apart parallel end plates 215 and 216 which rotate with respect to machine frame 201. Platen 60 is mounted for rotation within the turret frame 204 by being rotatably supported at one end within ball bearings 218 set in turret end plate 215 and by being rotatably supported at the other end within bearings 220 secured in turret end plate 216 for supporting drive shaft 217 for the platen. Similarly the platen 61 is journaled for rotation in bearings 222 set in turret end plate 215 for movement with shaft 225 journaled for rotation in bearings 227 set in turret end plate 216. Mounted around each of shafts 217 and 225 are coil springs 230 which urge the platens to the left, as viewed in FIG. 5 toward a plate member 235 fixed to machine frame 201 for a purpose to be described.

Platen 60 comprises a foraminous cylinder 241 having openings 243 which extend along the length of the cylinder for approximately a document width. Cylinder 241 is sealed at one end by a cap 245 and open at the opposite end for permitting connection to a vacuum producing means. A vacuum condition is produced by means of a conduit 250 snugly fitting over a tubing connection 251 formed in plate member 235. As the document is wrapped about the openings 243 the vacuum supplied through conduit 250 becomes sealed off. To ensure proper sealing of the cylinders, the platens 60 and 61 are provided with annular seals 254 and 255, respectively, which are urged in firm contact with plate member 235 by the action of coil springs 230.

Positioned slightly below and at an angle with tubing connection 251 is a tubing connection conduit 256 for insertion of a pressurized air conduit 258 to break vacuum in a chordal chamber 260 of platen 60. Chordal chamber 260 is defined by a longitudinally extending baffle plate 262 subtending a chord adjacent the leading edge of the document which abuts stop stud 64 on the periphery of cylinder 241 (see FIGURE 7). Baffle plate 262 is provided with spaced linear apertures 265 so that pressurized air can be pulsed into chamber 260 to momentarily break the vacuum holding the leading edge of the document to platen 60 while permitting a continuous vacuum to be exerted on the chamber from vacuum conduit 250. Hence the arc of cylinder 241 subtended by baffle plate 262 defines the document portion at which vacuum previously formed in chordal chamber 260 is momentarily broken to release the leading edge of the document.

When platen 61 is in the scanning or six o'clock position on turret assembly 10, this platen is similarly with vacuum and pressurized air applied through conduits 250 and 258, respectively. Platen 61 comprises a foraminous cylinder 270 formed with openings 272 and having an undercut diameter portion 272 adjacent tubing connection 251 and 256 in plate member 235. Baffle plate 280 formed with apertures 281 subtends cylinder 270 to form a chordal chamber 283 for receiving pressurized air to break the vacuum adjacent the leading edge of the document.

To rotate platens 60 and 61 on their axes of rotation and also revolve them about the axis of turret frame 204, drive assembly 210 utilizes a main driven gear 301 driven by a suitable drive represented diagrammatically as 302. Main driven gear 301 is connected to tubular sleeve 303 which is fixed to elongated sleeve 305 by pins 307 and 308 received in a keyway 309. Mounted at one end of the tubular sleeve 305 are spur gears 312 and 314 which mesh with gears 318 and 320 for driving platens 60 and 61 respectively. Thus as main driven gear 301 rotates, rotation is continuously imparted to the platens.

Also pinned to main driven gear 301 by pins 307 and 308 are gears 335 and 337, respectively, which are used to drive xerographic drum 20 and copy sheet feed 35, respectively. In this manner synchronization is at all times provided between the movement of platens 60 and 61, drum 20, and copy sheet feed 35.

To rotate turret frame 204 and revolve platens 60 and 61 about the turret axis, a shaft 350 is connected to turret end plate 216 via a hub member 325 pinned to the shaft by a pin 354. Hub member 352 is secured to turret end plate 216 and, when rotated, rotates the entire turret frame 204. A clutch mechanism generally designated 355 is adapted to provide transmission from main driven gear 301 to shaft 350. Movement imparted to elongated sleeve memberb 305 by main driven gear 301 is in turn imparted to an adapter hub 360 which is fixed to the sleeve by a pin 362 received in keyway 309.

Figure 8:
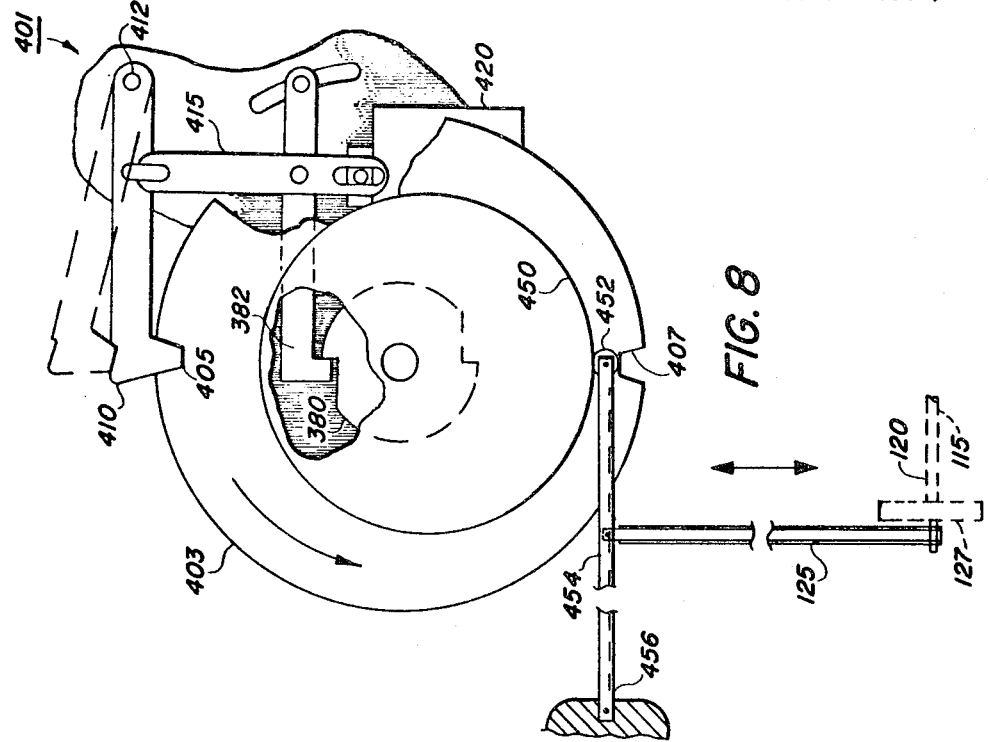
FIGURE 8 is a right hand end view of the turret assembly shown in FIGURE 5.

Movement of the adapter hub is imparted to a mounting hub 365 through the coils of clutch spring 370 wrapped around the diameter of the adapter hub 350 and a corresponding diameter of mounting hub 365. Spring 370 has one end terminating with an outwardly projecting release toe 375 for a purpose to be described. The coils of the spring have their inner diameter smaller than the external diameter of the adapter hub and mounting hub so that they are elastically or resiliently preloaded in relation to the adapter and the mounting hub. Mounted around the outer periphery of the clutch spring is a control sleeve 380 having a ratchet tooth outer periphery, as best shown in FIG. 8, arranged to be engaged by a pawl 382. Control sleeve 380 has an axial groove 384 on the inner periphery to engage the release toe 375 of the clutch spring. Release toe 375 which extends into the axial groove 384 in the release sleeve is restricted in its rotary movement by the control sleeve when engaged by pawl 382. This causes the coils of the spring to unwind against the movement of the mounting hub to extend their inner diameters to a size greater than the diameter of the adapter thus releasing the hub for independent movement and placing the entire clutch in an idler or non-torque transmitting attitude.

A solenoid control described hereinafter is provided to withdraw pawl 382 from the ratchet surface of sleeve 380 allowing adapter 360 to transmit torque through to the hub 365 via spring 370. When the hub is in the torque transmitting position it drives shaft 350 through a key member 390 in engagement therewith. In this manner turret frame 204 may be rotated or remain fixed depending upon whether the clutch is in the torque transmitting or non-torque transmitting condition, respectively.

To control the position of turret assembly 10 there is provided a control assembly 401 which receives a control signal from the control panel (not shown). Control assembly 401 comprises an index plate 403 secured on the end of shaft 350 and having a pair of notches 405 and 407 on its periphery for the two positions of platens 60 and 61. A pawl member 410 positioned to engage the notches in index plate 403 is fixed to a pivot 412 and connected to pawl 382 by connecting link 415. Connecting link 415 is movable vertically upward upon actuation by a solenoid 420 which on receiving a signal momentarily raises pawl 410 out of contact with notch 405 in index plate 403 simultaneously raising pawl 382 out of contact with control sleeve 380. In doing so, a force is released on clutch spring 370 permitting the clutch to assume torque transmitting attitude to rotate shaft 350 carrying index plate 403 and control sleeve 380 along therewith. Pawl 410 via connecting link 415 holds pawl 382 out of contact with sleeve 380 until such time as pawl 410 engages the notch 407 in the periphery of the index plate. When this occurs connecting link 415 urges pawl 382 into the appropriate ratchet surface on the control sleeve thereby causing the clutch to be in an idle or non-torque transmitting attitude again.

At the same time that turret assembly 10 is being positioned lens turret assembly 85 is being positioned in matching relationship therewith. On index plate 403 there is mounted a cam ring 450 eccentric to the plate axis (see FIG. 8). Cam ring 450 engages a follower roller 452 to displace a linkage assembly 454 pivotally fixed at pivot 456, in the direction of the arrows for positioning lens turret assembly 85. Upon rotation of the index plate by a signal received in solenoid 420, the eccentric path of ring 450 overcomes the bias of torsion spring 120 previously described to rotate shaft 115 thereby changing the lens setting in the lens turret assembly.

*Document pick-off mechanism*

After scanning the document for the number of copies desired, the leading edge of the document is peeled off from the rotary platen by a momentary pulse of pressurized air sufficient to break the vacuum thereon. To accomplish this, compressed air is supplied from a puffing mechanism responsive to a signal from a counter which counts off the number of revolutions of the platen before actuating the puffing mechanism.

Figure 9:
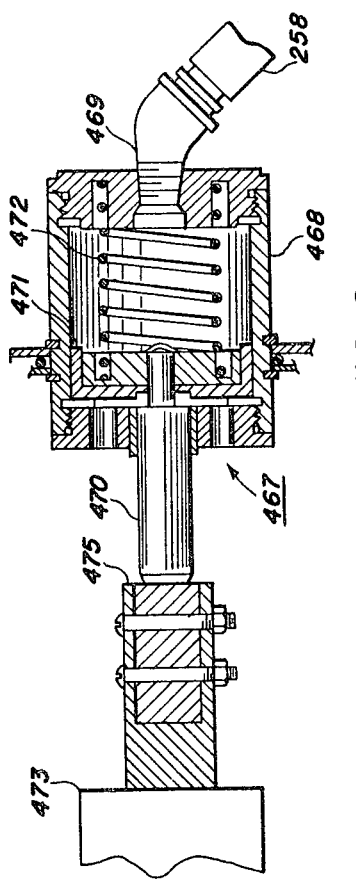
FIGURE 9 is a side-sectional view of the document puffing mechanism.

Shown in FIGURE 9 is a puffing mechanism 467 for delivering compressed air to conduit 258 previously described. Puffing mechanism 467 comprises a closed cylinder 468 adapted to receive a connector 469 which functions as both an inlet and discharge conduit for the cylinder. The cylinder is bored concentric with its center to slidably support a piston rod 470. Mounted within the cylinder 468 on the reduced end of piston rod 470 is a piston 471, and a spring 472 positioned to bias said piston toward the right on its return stroke.

The puffing mechanism has a normally de-energized solenoid 473 adapted to actuate the compression or forward stroke of the piston rod 470 of the pulsator by means of an actuator block 475 fastened to the forked left-hand end of the plunger of said solenoid. As the solenoid 473, which is controlled by a microswitch described hereinafter is energized, the magnetic field created by the coil of the solenoid results in the pushing of the piston rod 470 in the same direction, left as seen in FIG. 9 to effect a compression or forward stroke of the piston.

As a result, the compressed air passes into the conduit 258 and subsequently into chordal chamber 260.

To ensure that chordal chamber 260 is properly aligned at the instant of puffing, a microswitch 480 suitably mounted adjacent the lower extremity of turret assembly 10 is engaged by pins 482 and 484 protruding from platens 60 and 61, respectively (see FIGURE 5). Microswitch 480 is connected to a counter, as shown hereinafter, preset for the number of scans desired to emit a puffing signal to the puffing mechanism thereby separating the document from the platen.

Figure 10:
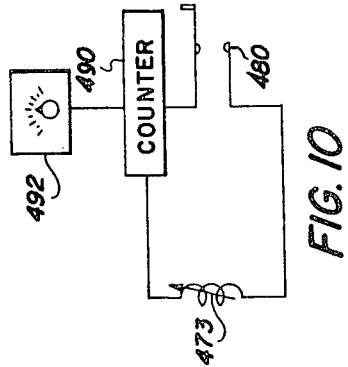
FIGURE 10 is a schematic of the puffing mechanism control.

The puffing operation can be more fully understood in connection with the schematic wiring diagram shown in FIGURE 10. An electrical counter 490 is preset for the number of copies, i.e., scans of the document, by a selector knob 492 on the control panel (not shown). Microswitch 480 normally open is closed by rotational movement of pin 482 about the axis of platen 60. Counter 490 counts off the number of revolutions until reaching zero at which time solenoid 473 is energized actuating puffing mechanism 467.

Once the leading edge of a sheet of transfer material has been separated from the surface of the platen, the remainder of the sheet will peel off due to the rotational force of the platen and pulling force exerted on the paper by the document guides. Contributing to the short duration of the puffing blasts is the fact that as the solenoid is de-energized, the return stroke of the piston effected by spring 472 reverses the fluid flow in conduit 258. Thus on the return stroke, air is drawn into the puffing mechanism through the conduit then acting as inlet conduit to supply air to the puffing mechanism.

While the invention has been described with reference to the structures disclosed herein, it is not confined to the details set forth, but is intended to cover such modifications or changes as may come within the scope of the following claims.

What is claimed is:
1. Document handling apparatus comprising
   a cylinder supported for rotation having tiny apertures formed over substantially the entire surface thereof,
   drive means for supplying continuous rotary motion to said cylinder,
   a plate member extending parallel to the longitudinal axis of said cylinder and affixed thereto and subtending an arc thereof to define a chordal chamber, said plate member having a plurality of spaced apart orifices formed therein,
   stop means located on said arc to position a document with its leading edge in overlying relation with said chordal chamber,
   a source of vacuum,
   first condit means communicating with said source of vacuum and the interior of said cylinder to exert a vacuum pull along the periphery thereof for wrapping a document therearound,
   air supply means for supplying a short duration puff of compressed air in response to a discrete electrical signal,
   second conduit means in communication with said air supply means and the interior of said chordal chamber, and
   circuit means for emitting a discrete electrical signal to said air supply means to momentarily break the vacuum pull exerted in the vicinity of said arc after a predetermined time interval.

2. Apparatus according to claim 1 including spaced guide members adjacent to the rotative path of said cylinder to receive the leading edge of the document upon being released from said cylinder.

3. Apparatus according to claim 1 wherein said circuit means includes a counter to preset the number of revolutions by said cylinder before emitting said discrete electrical signal.

4. Apparatus according to claim 1 including conveyor means for supplying the document to said cylinder in timed relation with the movement to said stop means.

5. In a document recording apparatus for producing multiple copies of a document transported from a document feed station past a scanning station and then to a document output station, document handling apparatus for controlling the movement of the document, comprising in combination
   a cylinder supported for rotation at a scanning station, said cylinder being formed with tiny apertures over substantially the entire surface thereof,
   drive means for supplying continuous rotary motion to said cylinder,
   a plate member extending parallel to the longitudinal axis of said cylinder and affixed thereto and subtending an arc to define a chordal chamber therein, said plate member having a plurality of spaced apart orifices formed therein,
   a stop member located on said arc to position a document with its leading edge in overlying relation with said chordal chamber,
   first conveyor means for supplying a document to be recorded in close proximity with said cylinder in timed relation with the movement of said stop member,
   channel means positioned adjacent to the rotative path of said cylinder to receive the leading edge of the document upon being released from said cylinder,
   second conveyor means positioned for receiving the document from said channel means and advancing it to a document output station,
   a source of vacuum,
   first conduit means communicating with said source of vacuum and the interior of said cylinder exert a vacuum pull along the periphery of said cylinder for wrapping a document therearound,
   air supply means for supplying a short duration puff of compressed air in response to a discrete electrical signal,
   second conduit means for communication with said air supply means and the interior of said chordal chamber, and
   circuit means for emitting a discrete electrical signal to said air supply means to momentarily break the vacuum pull exerted in the vicinity of said arc after a predetermined time interval when the leading edge of the document is adjacent to said channel means.

References Cited

UNITED STATES PATENTS

| | | | |
|---|---|---|---|
| 1,980,188 | 11/1934 | Cullen et al. | 271—74 |
| 2,822,172 | 2/1958 | Mayo et al. | 721—74 |

EVON C. BLUNK, *Primary Examiner.*

R. J. HICKEY, *Assistant Examiner.*